(12) United States Patent
Inoue

(10) Patent No.: US 6,431,154 B1
(45) Date of Patent: Aug. 13, 2002

(54) CONTROL SYSTEM FOR VARIABLE DISPLACEMENT ENGINES

(75) Inventor: Masaomi Inoue, Kariya (JP)

(73) Assignee: Denso Corporation, Kariya (JP)

( * ) Notice: Subject to any disclaimer, the term of this patent is extended or adjusted under 35 U.S.C. 154(b) by 90 days.

(21) Appl. No.: 09/702,879

(22) Filed: Nov. 1, 2000

(30) Foreign Application Priority Data

Nov. 5, 1999 (JP) ............................................. 11-314552

(51) Int. Cl.$^7$ ............................................... F02D 45/00
(52) U.S. Cl. ............. 123/481; 123/90.15; 123/198 DB; 123/198 F
(58) Field of Search ................................ 123/481, 480, 123/90.15, 91.11, 90.23, 90.24, 198 DB, 198 F

(56) References Cited

U.S. PATENT DOCUMENTS

| | | | | |
|---|---|---|---|---|
| 4,977,876 A | * | 12/1990 | Nanyoshi et al. | ............ 123/333 |
| 6,161,521 A | * | 12/2000 | Russ et al. | .................. 123/324 |
| 6,244,258 B1 | * | 6/2001 | Akiyama et al. | ........ 123/198 F |
| 6,328,007 B1 | * | 12/2001 | Hirasawa et al. | ........ 123/90.15 |

FOREIGN PATENT DOCUMENTS

| | | | | |
|---|---|---|---|---|
| JP | 6-346711 | | 12/1994 | |
| JP | 11-336577 | | 12/1999 | |
| JP | 2000-73799 | * | 3/2000 | ........... F02D/13/02 |

* cited by examiner

Primary Examiner—Lesley D. Morris
Assistant Examiner—Hieu T. Vo
(74) Attorney, Agent, or Firm—Nixon & Vanderhye P.C.

(57) ABSTRACT

An engine can be operated in different modes by varying the number of operating cylinders. In a reduced operating cylinder mode, the intake valve of the inoperative cylinder is maintained closed throughout all four strokes of a four-stroke cylinder cycle. The exhaust valve of the same inoperative cylinder is opened only in the suction stroke and the exhaust stroke. The inoperative cylinder sucks high pressure exhaust gas through the opened exhaust valve in the suction stroke and discharges it through the opened exhaust valve in the exhaust stroke after the compression stroke and the combustion stroke. The intake/exhaust valve control for the inoperative cylinder is started from the suction stroke after one combustion cycle of the inoperative cylinder when the engine is switched from an all cylinder-operating mode to a reduced cylinder-operating mode.

7 Claims, 4 Drawing Sheets though the exhaust valve opened in the suction stroke and discharges it therefrom through the exhaust valve opened in the exhaust stroke after the compression stroke and the explosion stroke. Thus, as no air is sucked into and discharged from the inoperative cylinder, discharge of NOx from an exhaust pipe is minimized. Further, as the difference in the pressures between the cylinders of the operative cylinder and the inoperative cylinder is reduced, the engine vibration can be reduced.

CONTROL SYSTEM FOR VARIABLE DISPLACEMENT ENGINES

CROSS REFERENCE TO RELATED APPLICATION

This application is based on and incorporates herein by reference Japanese Patent Application No. 11-314552 filed Nov. 5, 1999.

BACKGROUND OF THE INVENTION

The present invention relates to a control system for variable displacement internal combustion engines, and particularly a control system for operating an internal combustion engine by variably controlling the number of cylinders to which fuel is supplied in accordance with engine operating conditions.

Some conventional internal combustion engines are operated as variable displacement engines by reducing the number of operative cylinders to which fuel is supplied for air-fuel mixture combustion when the engine operates under the low load condition, so that fuel consumption is reduced.

In one type of the variable displacement engines, the intake valve and the exhaust valve of the inoperative cylinder to which no fuel is supplied for the combustion are opened and closed in the intake stroke and the exhaust stroke, respectively, in the same pattern as the intake valves and the exhaust valves of the operative cylinders are opened and closed. Air sucked into the inoperative cylinder through the intake valve is discharged into an exhaust pipe through the exhaust valve without air-fuel mixture combustion in the inoperative cylinder. The amount of nitrogen oxides (NOx) discharged from the exhaust pipe increases due to reaction of air discharged from the inoperative cylinder with nitrogen in high temperature exhaust gas discharged from the operative cylinders.

Under the low engine load condition, the intake pressure in the intake pipe is normally low because a throttle valve is not open so much. The inoperative cylinder suck air from the intake side and pump out the sucked air into the exhaust side at which the pressure is higher than the intake side. Thus, pumping loss increases and fuel consumption improves less, even when the engine operates with less number of operative cylinders.

In another type of the variable displacement engines, the intake valve and the exhaust valve of the inoperative cylinder are maintained closed throughout all strokes for inhibiting the discharge of air into the exhaust pipe and reducing the pumping loss. In this instance, the pressure in the inoperative cylinder does not rise so much due to no air suction. The maximum pressures in the operative cylinders and the inoperative cylinder differ greatly, thus increasing changes in engine output torque and causing engine vibration.

SUMMARY OF THE INVENTION

It is therefore an object of the present invention to provide a control system for variable displacement engines which improves fuel consumption without lessening exhaust emission and causing engine vibration.

According to the present invention, an internal combustion engine is operated as a variable displacement engine in such a manner that it is operated in either all cylinder-operated mode or reduced cylinder-operated mode by varying the number of operative cylinders into which fuel is injected. In the reduced cylinder-operated mode, an intake valve of the inoperative cylinder is maintained closed throughout the four strokes, suction, compression, explosion and exhaust, and an exhaust valve of the same is opened only in the suction stroke and the exhaust stroke. The inoperative cylinder sucks high pressure exhaust gas thereinto through the exhaust valve opened in the suction stroke and discharges it therefrom through the exhaust valve opened in the exhaust stroke after the compression stroke and the explosion stroke. Thus, as no air is sucked into and discharged from the inoperative cylinder, discharge of NOx from an exhaust pipe is minimized. Further, as the difference in the pressures between the cylinders of the operative cylinder and the inoperative cylinder is reduced, the engine vibration can be reduced.

Preferably, the intake/exhaust valve control for the inoperative cylinder is started from the suction stroke after one combustion cycle of the inoperative cylinder from the injection of fuel into the inoperative cylinder, when the engine is switched from the all cylinder-operated mode to the reduced cylinder-operated mode. The intake/exhaust valve control for the operative cylinder is terminated from the suction stroke after the injection of fuel into the inoperative cylinder, when the engine is switched from the reduced cylinder-operated mode to the all cylinder-operated mode.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
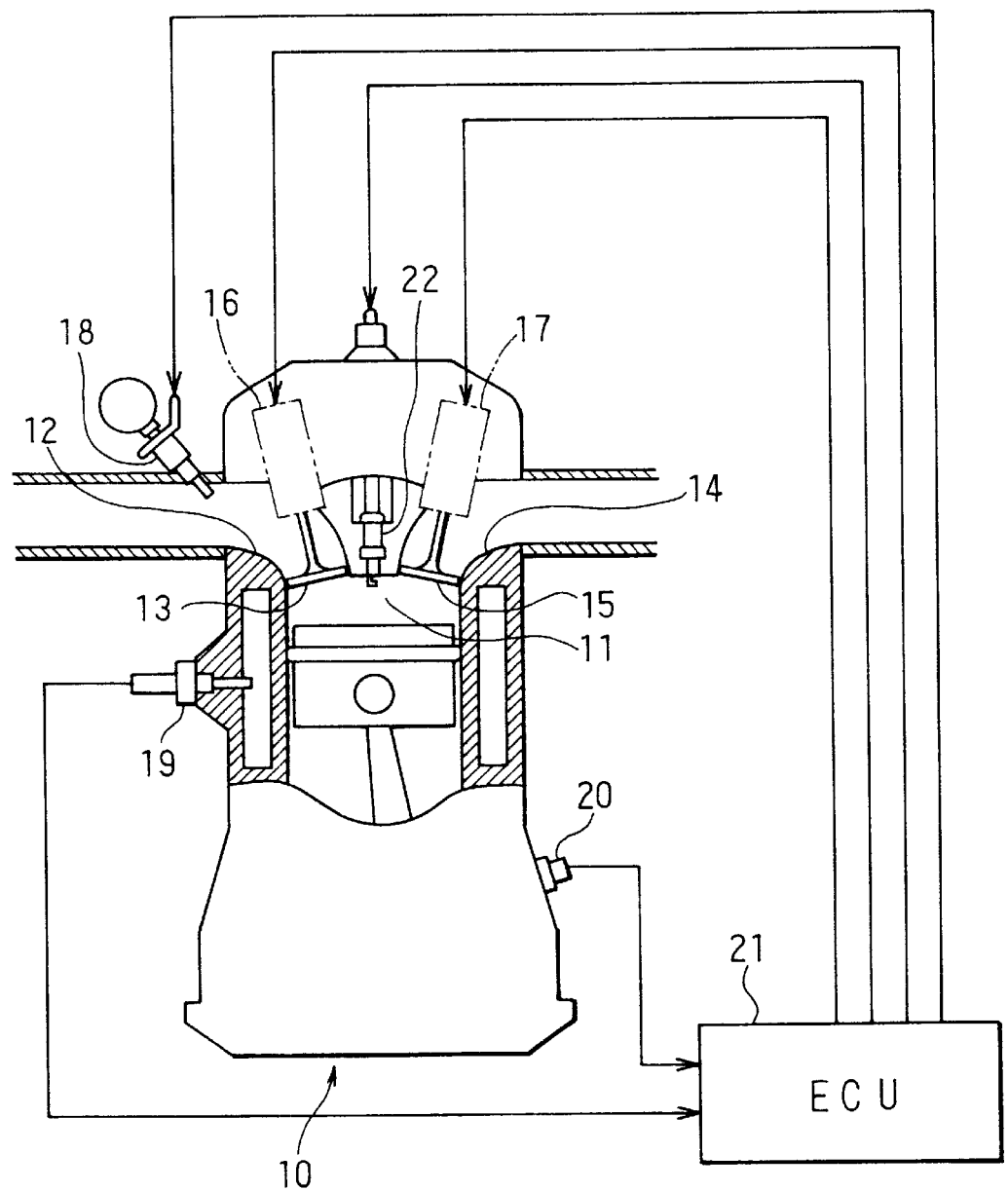
FIG. 1 is a schematic view showing a control system for variable displacement engines according to an embodiment of the present invention.

Referring to FIG. 1, an internal combustion engine 10 is a multi-cylinder type. Each cylinder 11 of the engine 10 is communicated with an intake port 12 through an intake valve 13 and with an exhaust port 14 through an exhaust valve 15. The intake valve 13 and exhaust valve 15 are connected to electromagnetic drive devices 16 and 17, respectively, to be driven to open and close electromagnetically. A fuel injector 18 is provided near each intake port 12 to inject fuel into the cylinder 11. A spark plug 22 is provided in each cylinder 11 to ignite air-fuel mixture in the cylinder 11. A coolant temperature sensor 19, a crank angle sensor 20 and the like are mounted on the engine 10 to detect coolant temperature, rotation speed and the like of the engine, respectively.

The sensors 19 and 20 are connected to an electronic control unit (ECU) 21. The ECU 21 is constructed with a microcomputer that are programmed to control fuel injection from injectors 18 and ignition timing of spark plugs 22 based on engine operation conditions detected by the sensors 19 and 20. Further, the ECU 21 is programmed to control the engine 10 to operate as a variable displacement-type engine by variably controlling the number of operative cylinders to which fuel is supplied for air-fuel mixture combustion. The engine 10 is thus operated in either a all cylinder-operated mode in which all the cylinders are supplied with fuel, or a reduced cylinder-operated mode in which only the limited number (for instance, one half) of all the cylinders are supplied with fuel.

Figure 2:
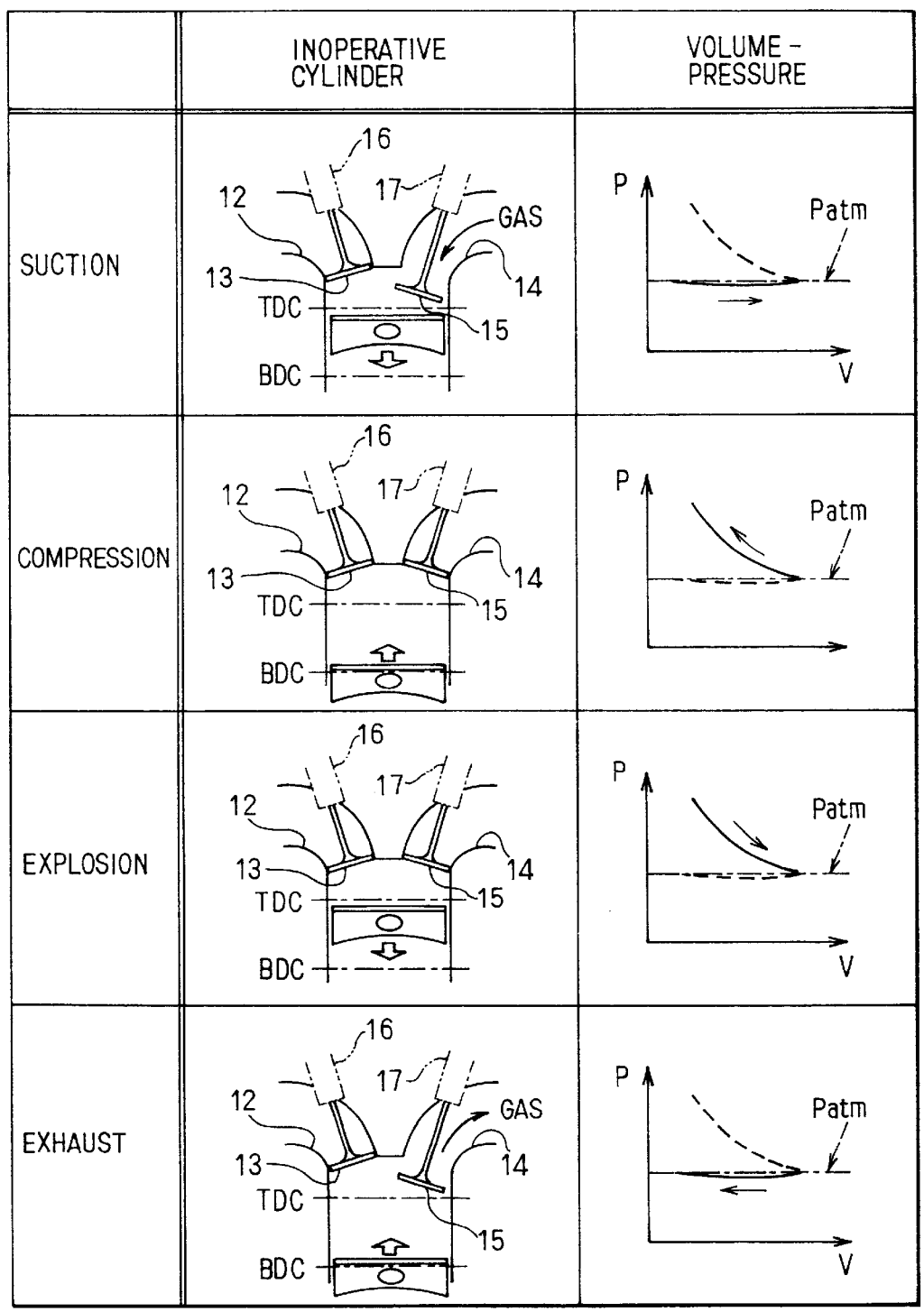
FIG. 2 is a diagram showing operations of the intake valve and the exhaust valve of an inoperative cylinder of an internal combustion engine in the embodiment.

In the reduced cylinder-operated mode, the intake valve 13 and the exhaust valve 15 of the inoperative cylinder to which no fuel is supplied are controlled as shown in FIG. 2.

Specifically, the intake valve 13 is maintained closed by the drive device 16 throughout all strokes (suction, compression, explosion and exhaust). The exhaust valve 15 is maintained, by the drive device 17, opened in the suction stroke and the exhaust stroke and closed in the compression stroke and the explosion stroke.

Figure 4:
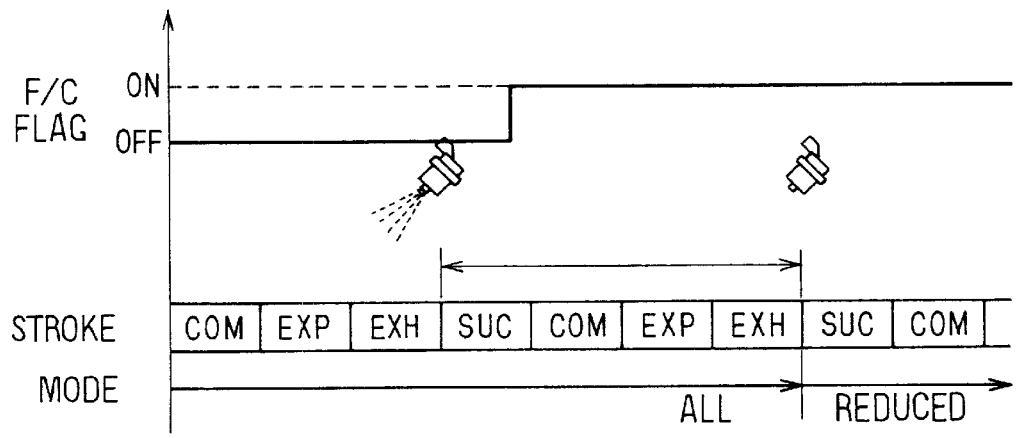
FIG. 4 is a timing diagram showing a transition from the all cylinder-operated mode to the reduced cylinder-operated mode in the embodiment.
Figure 5:
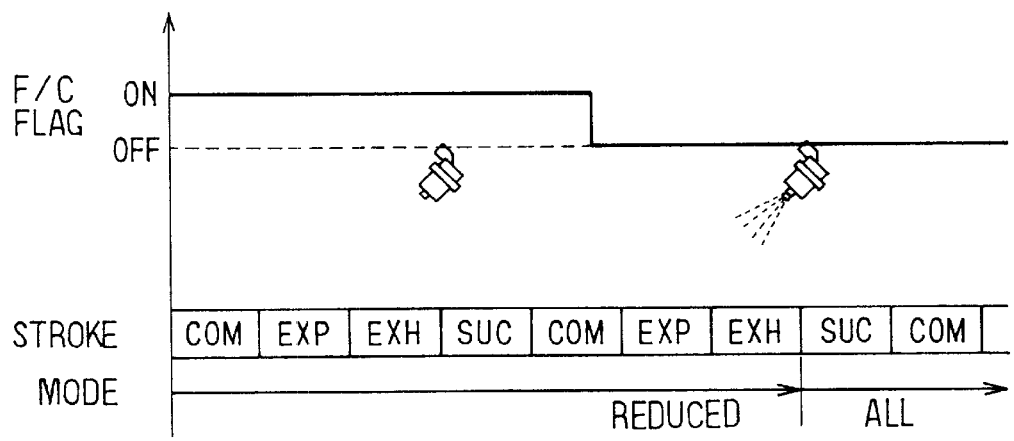
FIG. 5 is a timing diagram showing a transition from the reduced cylinder-operated mode to the all cylinder-operated mode in the embodiment.

More specifically, as shown in FIG. 4, when the engine 11 is switched from the all cylinder-operated mode to the reduced cylinder-operated mode, the above valve open/close control for the inoperative cylinder starts after an elapse of one combustion cycle (four strokes) from the last fuel injection into the cylinder 11 which is to be switched to the inoperative cylinder. However, as shown in FIG. 5, when the engine 11 is switched from the reduced cylinder-operated mode to the all cylinder-operated mode, the above valve open/close control for the inoperative cylinder ends from the intake stroke of the inoperative cylinder immediately after the fuel injection into the cylinder which is to be switched back to the operative cylinder.

Figure 3:
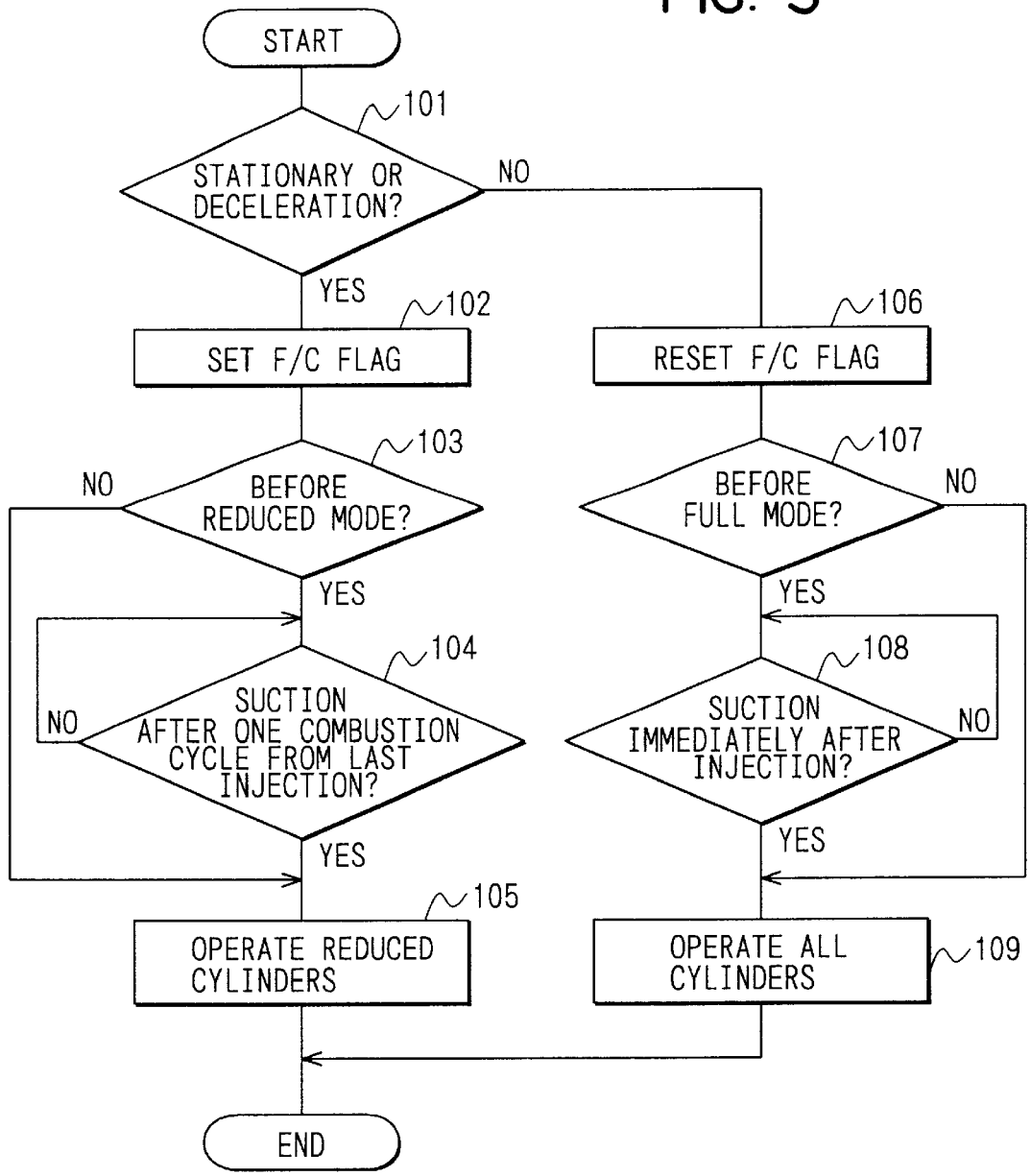
FIG. 3 is a flow diagram showing control processing executed in the embodiment.

The above valve open/close control is attained by the ECU 20 by executing the programmed routine shown in FIG. 3. This routine may be initiated every predetermined time or every predetermined angular rotation of the engine 10.

When this routine starts, it is checked at step 101 whether the engine 10 is under a predetermined load condition. This load condition may be defined as a stationary or deceleration condition in which the engine rotation speed is in the intermediate range and the engine load is in the low or intermediate range. If the check result at step 101 is YES, a fuel cut-off (F/C) flag is set (ON) at step 102 to stop fuel injection for predetermined cylinders (for instance, cylinders #1 and #4 in four-cylinder engine) so that those cylinders operate as inoperative cylinders. Then, whether it is before the transition from the all cylinder-operated mode to the reduced cylinder-operated mode is checked at step 103. If the check result is NO indicating that the engine 10 is already in the reduced cylinder-operated mode, this reduced cylinder-operated mode is continued at step 105.

If the check result at step 103 is YES indicating that the engine 10 is still in the all cylinder-operated mode, it is further checked at step 104 whether the cylinder which is designated as the inoperative cylinder is in the suction stroke after one combustion cycle from the last fuel injection thereto. If the check result is NO, the intake valve 13 and the exhaust valve 15 are driven to open and close in the same manner as in the normal all cylinder-operated mode. If the check result is YES, the reduced cylinder-operated mode is started at step 105.

In the reduced cylinder-operated mode, fuel is not injected into the inoperative cylinder. Further, as shown in FIG. 2, its intake valve 13 is continuously maintained closed by the drive device 16. Its exhaust valve 15 is maintained opened by the drive device 17 throughout the exhaust stroke and the suction stroke while being maintained closed throughout the compression stroke and explosion stroke. The exhaust valve 15 may be closed for a moment at the transition from the exhaust stroke to the intake stroke.

If the check result at step 101 is NO, the fuel cut-off flag is reset (OFF) to restart fuel supply to the cylinder which has not been supplied with fuel. Then, whether it is before the transition from the reduced cylinder-operated mode to all cylinder-operated mode is checked at step 107. If the check result is NO indicating that the engine 10 is already in the all cylinder-operated mode, this all cylinder-operated mode is continued at step 109.

If the check result at step 107 is YES indicating that the engine 10 is still in the reduced cylinder-operated mode, it is further checked at step 108 whether the cylinder which is designated as the operative cylinder is in the suction stroke immediately after the fuel injection thereto. If the check result is NO, the intake valve 13 and the exhaust valve 15 are driven in the same manner as in the reduced cylinder-operated mode. If the check result is YES, the fuel supply is restarted and the intake valve 13 and the exhaust valve 15 are driven to operate normally, that is, the intake valve 13 and the exhaust valve 15 are opened only in the suction stroke and the exhaust stroke, respectively.

According to the above embodiment, the exhaust valve 15 of the inoperative cylinder is opened during the exhaust stroke and the intake stroke and closed during the compression stroke and the explosion stroke, while the intake valve 13 of the inoperative cylinder is maintained closed throughout the four strokes. As a result, exhaust gas is sucked from the exhaust port 14 into the inoperative cylinder during the suction stroke and discharged from the inoperative cylinder during the exhaust stroke after being subjected to the compression and explosion. In the inoperative cylinder, the maximum pressure in the inoperative cylinder can be increased during the compression stroke than when the normal intake air is compressed, because the exhaust gas which is higher than the normal intake air in pressure is sucked and compressed.

Figure 6:
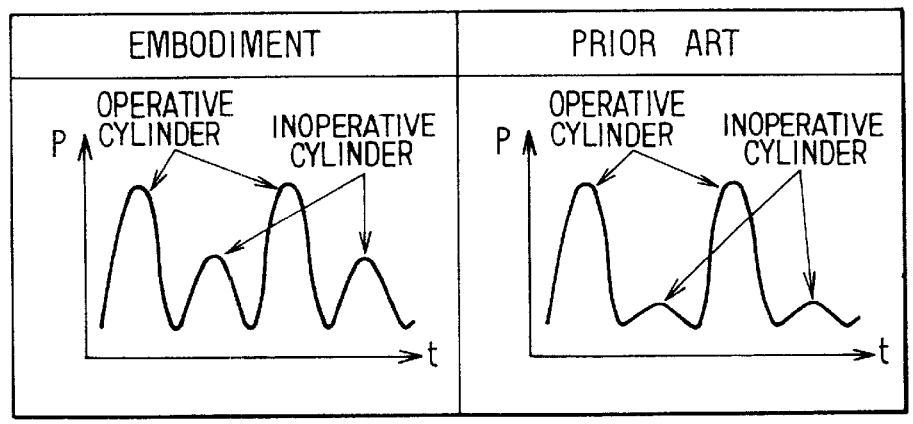
FIG. 6 is a diagram showing pressure changes in the inoperative cylinder in the embodiment and the prior art.

As a result, as shown in FIG. 6, the difference in maximum pressures in the compression stroke between the inoperative cylinder and the operative cylinder is reduced more in the above embodiment than in the conventional case in which both intake valve and exhaust valve of the inoperative cylinder are maintained closed throughout all the strokes. As the engine vibration is thus reduced even in the reduced cylinder-operated mode, the engine 11 can be operated smoothly. Further, as the high pressure exhaust gas is sucked and discharged through the same exhaust port 14 of the inoperative cylinder 11, the pumping loss can be reduced to substantially zero while reducing the fuel consumption of the engine 11. Still further, as no intake air is sucked into nor discharged from the inoperative cylinder, the oxygen concentration in the exhaust pipe does not increase thus restricting an increase of NOx discharged from the exhaust pipe into air.

It is possible to change the engine operation mode from the all cylinder-operated mode to the reduced cylinder-operated mode at the same time as the fuel cut-off flag is set. In this instance, that is, if the fuel cut-off flag is set to continuously close the intake valve 13 of the cylinder 11 which is designated as the inoperative cylinder immediately after fuel is injected from the injector 18, the injected fuel cannot be sucked into the cylinder 11.

Therefore, as implemented in the above embodiment, it is preferable that the reduced cylinder-operated mode is started after one combustion cycle (four strokes) from the last injection of fuel to the cylinder 11 which is to be maintained as the inoperative cylinder. Thus, even when the fuel cut-off flag is set immediately after the last fuel injection, the all cylinder-operated mode is maintained during the one combustion cycle so that the last injected fuel may be combusted and discharged in the normal manner. As a result, the engine operation mode transition can be optimized.

It is possible to change the engine operation mode from the reduced cylinder-operated mode to the all cylinder-operated mode at the same time as the fuel cut-off flag is reset. In this instance, that is, if the all cylinder-operated mode is restarted immediately after the fuel cut-off flag is reset, the intake valve 13 of the cylinder 11 which was held inoperative is opened without fuel injection from the injector 18. Air sucked through this intake valve 13 is discharged into the exhaust pipe without being combusted in the explosion stroke. The oxygen in this air disadvantageously increases NOx in the exhaust pipe.

Therefore, as implemented in the above embodiment, it is preferable to restart the all cylinder-operated mode after the fuel is injected into the cylinder 11 which was maintained as the inoperative cylinder. That is, even if the fuel cut-off flag is reset, the all cylinder-operated mode is restarted from the suction stroke at which the fuel injection is resumed. As a result, the fuel injected after the reduced cylinder-operated mode can be sucked and combusted as normal, thereby minimizing increase of NOx in the exhaust pipe.

The present invention should not be limited to the disclosed embodiment, but may be implemented in many other ways without departing from the spirit of the invention. For instance, the intake valve and the exhaust valve may be driven mechanically, that is, by cam mechanisms, in place of the electromagnetic-type drive devices. In this instance, an additional mechanism may be provided for closing the intake valve of the inoperative cylinder continuously throughout the four strokes and for opening the exhaust valve of the inoperative cylinder only in the suction stroke and the exhaust stroke. Still further, the above control may be implemented in other types of engines which are operated with variable number of cylinders.

What is claimed is:

1. A control system comprising:
   an engine having a plurality of cylinders each of which has an intake valve and an exhaust valve, the engine being operated with all the cylinders as an operative cylinder into which fuel is injected in all cylinder-operated mode and being operated with only a part of the cylinders as the operative cylinder and a remaining part of the cylinders as an inoperative cylinder into which no fuel is injected in reduced cylinder-operated mode; and
   intake/exhaust valve control means for closing the intake valve of the inoperative cylinder throughout all strokes of the engine and opening the exhaust valve of the inoperative cylinder only in a suction stroke and an exhaust stroke in the reduced cylinder-operated mode.

2. A control system as in claim 1, wherein:
   the intake/exhaust valve control means starts a valve opening/closing operation for the reduced cylinder-operated mode from the suction stroke of the inoperative cylinder after one combustion cycle from a last injection of fuel into the inoperative cylinder, when the engine is switched from the all cylinder-operated mode to the reduced cylinder-operated mode.

3. A control system as in claim 1, wherein:
   the intake/exhaust valve control means restarts the valve opening/closing operation for the all cylinder-operated mode from the suction stroke of the inoperative cylinder to which the fuel is injected when the engine is switched from the reduced cylinder-operated mode to the all cylinder-operated mode.

4. A control method for a four-stroke engine having a plurality of cylinders each of which has an intake valve and an exhaust valve, the control method comprising the steps of:
   switching the engine from a first operation mode to a second operation mode in which fuel is injected into a reduced number of cylinders than in the first mode, so that a part of the cylinders into which fuel is injected is operated as an operative cylinder and a remaining part of the cylinders is operated as an inoperative cylinder in the second mode; and
   controlling the intake valve and the exhaust valve of the inoperative cylinder during the second operation mode in such a manner that the inoperative cylinder sucks exhaust gas through the exhaust valve in a suction stroke and discharges the sucked exhaust gas through the exhaust valve in an exhaust stroke.

5. A control method as in claim 4, wherein:
   the valve controlling step is started after one cycle of the four strokes of the inoperative cylinder from an injection of fuel into the cylinder which is to be switched from the operative cylinder to the inoperative cylinder, when the operation mode is switched from the first mode to the second mode.

6. A control method as in claim 4, wherein:
   the valve controlling step is terminated after an injection of fuel into the cylinder which is to be switched from the inoperative cylinder to the operative cylinder, when the operation mode is switched from the second mode to the first mode.

7. A control method as in claim 4, wherein the valve controlling step includes the steps of:
   maintaining the intake valve of the inoperative cylinder continuously throughout the four strokes of the inoperative cylinder; and
   maintaining the exhaust valve of the inoperative cylinder continuously only throughout a compression stroke and an explosion stroke of the inoperative cylinder.

* * * * *